US012033257B1

(12) United States Patent
Baron et al.

(10) Patent No.: US 12,033,257 B1
(45) Date of Patent: Jul. 9, 2024

(54) SYSTEMS AND METHODS CONFIGURED TO FACILITATE ANIMATION GENERATION

(71) Applicant: Mindshow Inc., Los Angeles, CA (US)

(72) Inventors: Gil Baron, Los Angeles, CA (US); William Stuart Farquhar, Hollis, NH (US); John Kanikula Peters, Glendale, CA (US); Sharon Bordas, Los Angeles, CA (US)

(73) Assignee: Mindshow Inc., Los Angeles, CA (US)

( * ) Notice: Subject to any disclaimer, the term of this patent is extended or adjusted under 35 U.S.C. 154(b) by 286 days.

(21) Appl. No.: 17/705,028

(22) Filed: Mar. 25, 2022

(51) Int. Cl.
*G06T 13/00* (2011.01)

(52) U.S. Cl.
CPC ................................... *G06T 13/00* (2013.01)

(58) Field of Classification Search
CPC ........................................................ G06T 13/00
See application file for complete search history.

(56) References Cited

U.S. PATENT DOCUMENTS

| | | | |
|---|---|---|---|
| 6,686,918 B1 * | 2/2004 | Cajolet | G11B 27/34 345/473 |
| 8,284,157 B2 | 10/2012 | Markovic | |
| 8,937,620 B1 | 1/2015 | Teller | |
| 9,159,151 B2 | 10/2015 | Perez | |
| 10,228,760 B1 * | 3/2019 | Ross | A63F 13/211 |
| 10,664,045 B2 | 5/2020 | Ross | |
| 10,969,860 B2 | 4/2021 | Ross | |
| 11,231,773 B2 | 1/2022 | Ross | |
| 2002/0105521 A1 | 8/2002 | Kurzweil | |
| 2003/0146915 A1 | 8/2003 | Brook | |
| 2009/0307189 A1 | 12/2009 | Bobbitt | |

(Continued)

FOREIGN PATENT DOCUMENTS

| | | | | |
|---|---|---|---|---|
| GB | 2568475 A | * | 5/2019 | .............. G06K 9/00 |
| WO | 2003058518 A2 | | 7/2003 | |

OTHER PUBLICATIONS

Morozov, Mikhail, et al., Asynchronous Immersive Classes in a 3D Virtual World: Extended Description of vAcademia; LNCS 7848, 2013, Special Issue of Transaction on Computational Sciences, (20 pages).

(Continued)

*Primary Examiner* — Said Broome
*Assistant Examiner* — Donna J. Ricks
(74) *Attorney, Agent, or Firm* — Esplin & Associates, PC

(57) ABSTRACT

Systems and methods configured to facilitate animation generation are disclosed. Exemplary implementations may: capture via one or more sensors motion and/or sound made by one or more subjects in physical space and generate output signals conveying information related to the motion and/or the sound made by individual ones of the one or more subjects; store, in electronic storage, final compiled animation scenes, initial compiled animation scenes corresponding to the final compiled animation scenes, preliminary animation information associated with the final compiled animation scenes, and input refinement information; and train, from the final compiled animation scenes, the initial compiled animation scenes corresponding to the final compiled animation scenes, the preliminary animation information, and the input refinement information, an animation prediction model.

20 Claims, 3 Drawing Sheets

(56) References Cited

U.S. PATENT DOCUMENTS

| | | |
|---|---|---|
| 2010/0008639 A1 | 1/2010 | Greenberg |
| 2011/0064388 A1 | 3/2011 | Brown |
| 2013/0278607 A1 | 10/2013 | Twigg |
| 2014/0267350 A1 | 9/2014 | Kass |
| 2015/0030305 A1 | 1/2015 | Moon |
| 2015/0243324 A1 | 8/2015 | Sandrew |
| 2017/0046906 A1 | 2/2017 | Hilbert |
| 2017/0061704 A1 | 3/2017 | Gewicke |
| 2019/0204906 A1 | 7/2019 | Ross |
| 2020/0019242 A1* | 1/2020 | Atlas .................. G06N 20/00 |
| 2020/0066022 A1 | 2/2020 | Leong |
| 2020/0226724 A1 | 7/2020 | Fang |
| 2020/0249747 A1 | 8/2020 | Ross |
| 2020/0311120 A1 | 10/2020 | Zhao |
| 2021/0117736 A1 | 4/2021 | Merler |
| 2021/0200303 A1 | 7/2021 | Ross |
| 2021/0279269 A1 | 9/2021 | Verma |
| 2022/0083130 A1 | 3/2022 | Ross |
| 2023/0109054 A1 | 4/2023 | Michael |

OTHER PUBLICATIONS

Greenhalgh, et al., Temporal Links: Recording and Replaying Virtual Environments, 2000, School of Computer Science and Information Technology, The University of Nottingham (8 pages).

\* cited by examiner

SYSTEMS AND METHODS CONFIGURED TO FACILITATE ANIMATION GENERATION

FIELD OF THE DISCLOSURE

The present disclosure relates to systems and methods configured to facilitate animation generation.

BACKGROUND

Motion capture is generally known. A subject's motions, sounds, and/or other actions may be captured by a computer and reflected in the motions, sounds, and/or other actions of a character within a scene. However, streamlining the motion capture to final compiled animation scenes may not be known.

SUMMARY

One aspect of the present disclosure relates to a system configured to facilitate animation generation. The system may include one or more hardware processors configured by machine-readable instructions, sensor(s), electronic storage, and/or other elements. Machine-readable instructions may include one or more instruction components. The instruction components may include computer program components. The instruction components may include one or more of record component, training component, change indicating component, input receiving component, and/or other instruction components.

The sensor(s) may be configured to capture motion, sound, and/or actions made by one or more subjects in physical space. The physical space may be a studio, a living room, outside, and/or other physical spaces. The sensor(s) may be configured generate output signals conveying information related to the motion, the sound, and/or the actions made by individual ones of the one or more subjects.

The electronic storage may be configured to store final compiled animation scenes, initial compiled animation scenes, preliminary animation information associated with the final compiled animation scenes, input refinement information, and/or other information. The preliminary animation information may include entity information for entities, tuning information, and/or other information.

The entity information may include entity definitions, motion capture information used to generate the associated final compiled animation scene, and/or other information. The individual entity definitions may define the individual entities in the associated final compiled animation scene. The motion capture information may reflect the motion and/or the sound made by the one or more subjects as the one or more subjects represent the entities in the associated final compiled animation scene. The tuning information may define values to animation parameters for the associated final compiled animation scene. The initial compiled animation scenes may be animation scenes generated initially from the preliminary animation information such that the entity information for the entities are integrated with the tuning information so that the initial compiled animation scenes include the entities manifesting the motion and/or the sound reflected by the motion capture information in the animation setting defined by the tuning information. The input refinement information may include adjustments to the preliminary animation information and/or the initial compiled animation scenes to refine the initial compiled scenes to the final compiled animation scenes.

The training component may be configured to train an animation predicted model. The animation predicted model may be trained from the final compiled animation scenes, the initial compiled animation scenes corresponding to the final compiled animation scenes, the preliminary animation information associated with the final compiled animation scenes, the input refinement information, and/or other information. The animation prediction model may predict predicted refinement information that refines an input initial compiled animation scene to an output predicted compiled animation scene based on the input initial compiled animation scene and the preliminary animation information that is associated with the input initial compiled animation scene.

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

Figure 1:
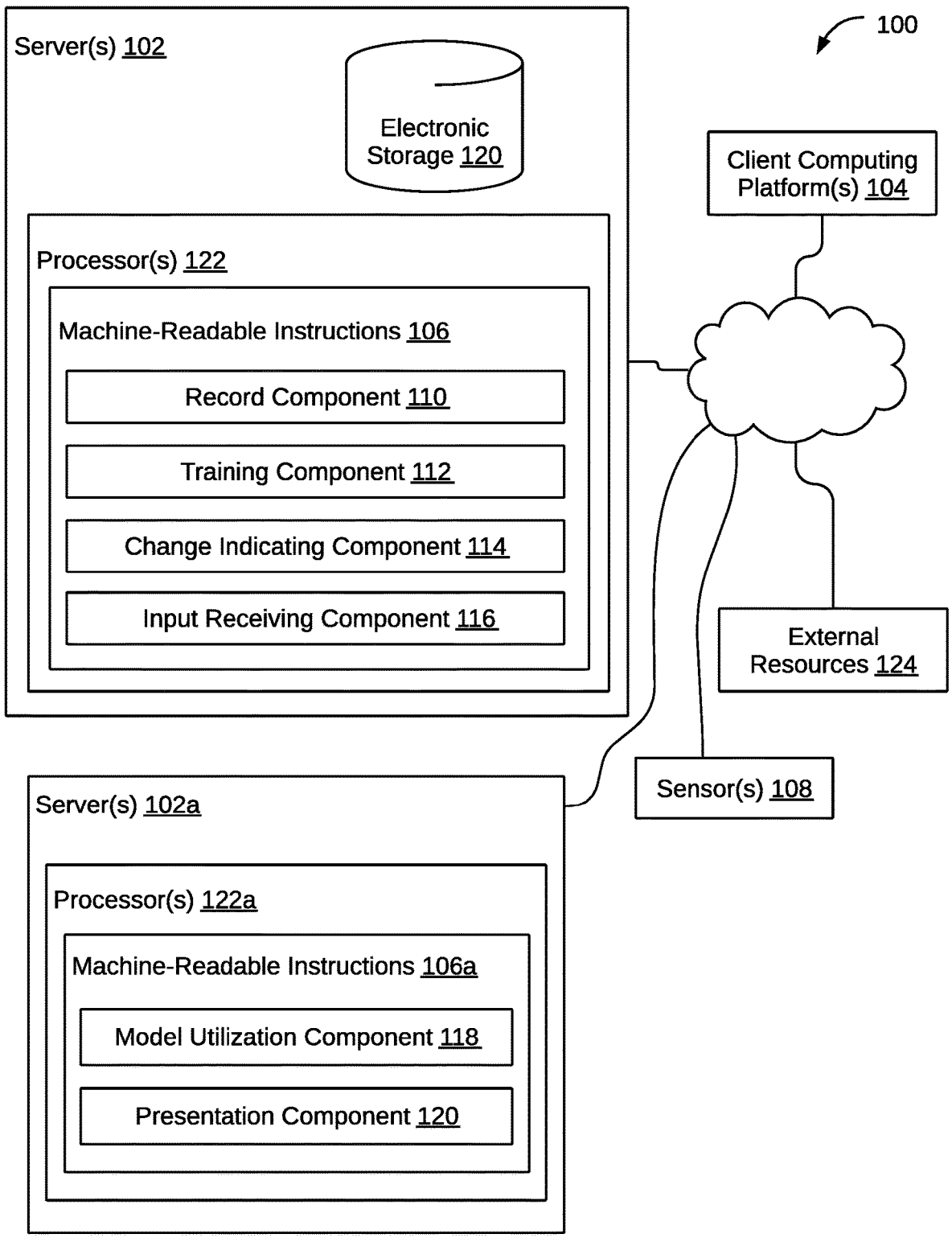
FIG. 1 illustrates a system configured to facilitate animation generation, in accordance with one or more implementations.

FIG. 1 illustrates a system 100 configured to facilitate animation generation, in accordance with one or more implementations. In some implementations, system 100 may include one or more servers 102, sensor(s) 108, electronic storage 120, and/or other elements. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Subjects may access system 100 via client computing platform(s) 104. Server(s) 102 may be configured by machine-readable instructions 106. Machine-readable instructions 106 may include one or more instruction components. The instruction components may include computer program components. The instruction components may include one or more of record component 110, training component 112, change indicating component 114, input receiving component 116, and/or other instruction components.

Sensor(s) 108 may be configured to capture motion, sound, and/or actions made by one or more subjects in physical space to generate motion capture information. The subjects may include an at-home creator, one or more professional creators (e.g., actors, producers, directors, etc.), and/or other subjects. The physical space may be a studio, a living room, outside, and/or other physical spaces. Sensor(s) 108 may be configured generate output signals conveying information related to the motion, the sound, and/or the actions made by individual ones of the one or more subjects. Capturing the motion of the one or more subjects may include capturing the physical movement muscle articulations, positions, gestures, actions, noises, dialogue, and/or other motions, sounds, and/or actions of at least a portion of the subject's body (e.g., arms, legs, torso, head, knees, elbows, hands, feet, eyes, mouth, etc.). Capturing the motion of one or more subjects may include capturing the body position, movement and muscle articulation for large scale body poses and motions, and/or movement and muscle articulation for small scale things (e.g., eye direction, squinting, and/or other small-scale movement and/or articulation). In some implementations, sensor(s) 108 may include one or more cameras and/or other optical sensors, inertial sensors, mechanical motion sensors, magnetic sensors, depth sensors, microphones, gyrosensor, accelerometer, laser position sensor, pressure sensors, volumetric sensors, voxel recordings/sensors, positional sensors, and controller-based sensors, and/or other sensors.

In some implementations, sensor(s) 108 may be configured to generate output signals conveying information related to view direction, location, and/or other actions of the subject and/or other information. The view direction of the subject may correspond to a physical direction toward which a gaze of the subject is directed, an orientation of one or more parts of the subject's body (e.g., the subject's head may be tilted, the subject may be leaning over), a position of a subject within the virtual space, and/or other directional information. The information related to the motion, the sounds, the view direction, the location, and/or other actions of the subject may include any motion capture information they may be captured in accordance with existing and/or future methods. These examples are not intended to be limiting. In some implementations, sensors 108 may include one or more of a GPS sensor, a gyroscope, an accelerometer, an altimeter, a compass, a camera-based sensor, a magnetic sensor, an optical sensor, an infrared sensor, a motion tracking sensor, an inertial sensor, a CCB sensor, an eye tracking sensor, a facial tracking sensor, a body tracking sensor, and/or other sensors.

In some implementations, record component 110 may be configured to record the motion capture information of one or more of the subjects by way of sensor(s) 108 to generate the input initial compiled animation scene (i.e., the animated motions, the animated sound, and the other animated actions thereof). In some implementations, recording the motion capture information of multiple ones of the subjects may be synchronous or asynchronous as described in co-pending U.S. application Ser. No. 17/203,646 entitled "SYSTEM AND METHOD FOR GENERATING A VIRTUAL REALITY SCENE BASED ON INDIVIDUAL ASYNCHRONOUS MOTION CAPTURE RECORDINGS", the disclosure of which is incorporated by reference in its entirety herein.

In some implementations, the motion capture information may be presented to the subjects during recording of the motion capture information. Thus, the subjects may view their motions and/or hear their sounds to be represented by the entities in real-time. In some implementations, the motion capture information recorded may be presented to the one or more subjects subsequent to its recording for reviewing, adjusting, approval, initiating a re-record, and/or other actions. Record component 110 and/or other components described herein may be configured to present the motion capture information. Such presentation may be via client computing platforms 104 associated with the subjects (e.g., projector on a wall, a television, a computer screen, etc.).

Electronic storage 120 may be configured to store final compiled animation scenes, initial compiled animation scenes, preliminary animation information associated with the final compiled animation scenes, input refinement information, and/or other information. The preliminary animation information may define individual elements that ultimately comprise the final compiled animation scenes. The preliminary animation information may include entity information for entities, tuning information, and/or other information. The entities may include characters and inanimate objects.

The entity information for the individual entities may include entity definitions, the motion capture information, and/or other entity information. The individual entity definitions may define the individual entities in an associated final compiled animation scene. The entity definitions may include entity values that define entity parameters including one or more of a visual appearance, an audio, a location, a pose of the entity, style of movement, and/or entity parameters. The visual appearance of the individual entities may include one or more of clothing, height, width, hairstyle, accessories, skin color, headwear, and/or other visual appearances. The audio of the individual entities may include entity voices, entity-initiated noises (e.g., stomp, clap, etc.) and/or other audio related to the individual entities. The audio conveyed by the entities may be based on the sound made by the one or more subjects. Individual locations of the individual entities may change throughout a scene duration. For example, the entities may walk, run, dance, fight, and/or other actions of which change the location of the individual entities. The individual locations of the individual entities may define virtual coordinates within an animation setting that adjust with movement of the entities. The pose of the individual entities may define the posture, attitude of the entity's body, attitude of the entity's head, and/or other poses of the individual entities. The attitude may include values for a yaw angle, a pitch angle, and a roll angle. The style of movement may refer to how the individual entities within the associated final compiled animation scene generally move. For example, how a head, a trunk, and limbs of a human may move is a different style than how a head, a trunk, and limbs of a puppet may move. By way of non-limiting example, the style of movement may include human-like, puppet-like, robotic, barbaric, and/or other styles of movement.

The animation setting may comprise a virtual environment that surrounds one or more of the entities within animation scenes. The virtual environment may comprise of a topography, the entities present, simulated physical phenomena (e.g., wind, rain, earthquakes, and/or other phenomena), and/or other elements of the virtual environment. In some instances, the topography may be a 2-dimensional topography. In other instances, the topography may be a 3-dimensional topography. The topography may include dimensions of the space, and/or surface features of a surface or entities (e.g., inanimate objects) that are "native" to the space. In some instances, the topography may describe a surface (e.g., a ground surface) that runs through at least a substantial section of the space. In some instances, the topography may describe a volume with one or more entities positioned therein (e.g., a simulation of gravity-deprived space with one or more celestial bodies positioned therein). For example, the virtual environment may include nature entities (e.g., trees, bodies of water, mountains, etc.), interior entities (e.g., a couch, a chair, a lamp, etc.), and/or other entities.

The motion capture information may be used to generate the associated final compiled animation scene. The motion capture information may reflect the motion and/or the sound made by the one or more subjects as the one or more subjects represent the entities in the associated final compiled animation scene. The motion capture information of the entities may include a change in one or more of the attitudes, the pose, the location, and/or other entity values so that the motion and/or the sound of the entity is depicted. By way of non-limiting example, the motion may include tracking the motion, physical movements, and/or muscle articulations of one or more users. The motion may include one or more of body tracking, physical location tracking, facial tracking, eye tracking, hand tracking, foot tracking, elbow tracking, knee tracking, and/or any type of tracking that may enable recording and/or capture of users' motions, physical movements, muscle articulations, expressions, postures, reflexes, and/or other motions and/or movements.

The tuning information may define values to animation parameters for the associated final compiled animation scene. The tuning information may include values that define the animation parameters that include one or more of visual attributes, ambient audio, lighting, the style of movement for all entities, an animation style, and/or other animation parameters. The visual attributes include one or more of a color, shading, a pattern, a texture, and/or other parameters for visual attributes. Ambient audio may include one or more background noises such as car traffic, animal noises (e.g., dog barking, birds chirping), talking, and/or other ambient audio. Lighting may include ambient lighting, spot lighting, accent lighting, and/or other lighting. The animation style may be one of stop motion, two-dimensional motion, three-dimensional motion, traditional animation, motion graphics, Claymation, and/or other animation styles.

The final compiled animation scenes may refer to animation scenes that are finalized for viewing and/or distribution to consumers. The final compiled animation scenes may have been adjusted and/or manipulated by the subjects and/or users to generate such. The consumers may include viewers, subscribers, players, and/or other consumers.

The initial compiled animation scenes may correspond to the final compiled animation scenes. The initial compiled animation scenes may comprise of a version of the final compiled animation scenes that are not finalized for viewing and/or distribution to the consumers. The initial compiled animation scenes may be animation scenes generated initially from the preliminary animation information and/or other information. As such, the entity information for the entities may be integrated with the tuning information so that the initial compiled animation scenes include the entities manifesting the motion, the sound, and/or other actions reflected by the motion capture information in the animation setting. In some implementations, the initial compiled animation scenes may require adjustments to generate the corresponding final compiled animation scenes.

The initial compiled animation scenes may comprise of attributes. Such attributes may require the adjustments to generate the corresponding final compiled animation scenes. The attributes may include the entity definitions, the tuning information, animated motions that correspond to the motion capture information, animated sound that correspond to the motion capture information, other animated actions that correspond to the motion capture information, the animation setting, and/or other information. The animated motions, the animated sound, and/or other animated actions may be a rendering of the motion capture information performed by the respective entities. In some implementations, the animated motions, the animated sound, and/or other animated actions may mirror the motion capture information. In some implementations, the animated motions, the animated sound, and/or other animated actions may be different from the exact motion capture information while corresponding to the motion capture information.

The input refinement information may include the adjustments to the preliminary animation information, the initial compiled animation scenes, the animation setting, and/or other information. The adjustments may refine the initial compiled scenes to the final compiled animation scenes. For example, the adjustments to the preliminary animation information may include adjustments to the height of a given entity, the skin color of a character entity, the topography of the animation setting, and/or other adjustments. In some implementations, the input refinement information may include adjustments to the animated motions, the animated sound, and/or other animated actions.

In some implementations, input receiving component 116 may be configured to receive subject input and/or user input related to the preliminary animation information and/or the initial compiled animation scenes to refine the initial compiled scenes to the final compiled animation scenes. Such subject input may be or be included in the input refinement information. That is, a subject may provide input that adjusts some or all of the preliminary animation information, the attributes of the initial compiled animation scenes, and/or other information. The subject input may be provided by the subject and received via client computing platforms 104. The user input may be provided by users of system 100. For example, the users may include a director, a screenwriter, a cinematographer, an editor, and/or other users. In some implementations, the users may be the same as the subjects. In some implementations, the users may be different than the subjects.

Training component 112 may be configured to train an animation prediction model that predicts predicted refinement information. The animation prediction model may be trained from the final compiled animation scenes, the initial compiled animation scenes corresponding to the final compiled animation scenes, the preliminary animation information associated with the final compiled animation scenes, the input refinement information, and/or other information. The predicted refinement information may refine an input initial compiled animation scene to an output predicted compiled animation scene based on the input initial compiled animation scene, the preliminary animation information, and/or other information. The preliminary animation information may be associated with, include, and/or comprise the input initial compiled animation scene.

In some implementations, the entity definitions for the entities included in the input initial compiled animation scene may be imported from external resources 124, generated by defining entity values for the entity parameters, pre-generated and stored in electronic storage 120, and/or from other sources. In some implementations, the input initial compiled animation scene may be recorded and/or generated by the one or more subjects by way of sensor(s) 108 and/or other computer components.

The output predicted compiled animation scene may refer to a product of utilizing the predicted refinement information (e.g., by model utilization component 118). In some implementations, the output predicted compiled animation scene may be finalized for viewing and/or distributing to the consumers. In some implementations, the output predicted compiled animation scene may be further adjusted by the one or more subjects and/or users. The further adjustments may be received by input receiving component 116 and stored as supplemental input refinement information. The supplemental input refinement information may be stored to electronic storage 120 and used by training component 112 for the training.

In some implementations, training for the animation prediction model may occur in an ongoing manner as additional initial animation compiled scenes, corresponding final animation compiled scenes, the supplemental input refinement information, and/or other information are stored to electronic storage 120. The term "ongoing manner" as used herein may refer to continuing to perform an action (e.g., train) periodically (e.g., every day, upon every additionally stored initial animation compiled scene and corresponding final animation compiled scene, etc.) until receipt of an indication to terminate. The indication to terminate may include powering off server(s) 102, subject input termination, resetting server(s) 102, and/or other indications of termination. In some implementations, the animation prediction model may be stored in electronic storage 120.

The predicted refinement information may include adjustments to the entity definitions for the entities included in the input initial compiled animation scene; adjustments to the animated motions, the animated sounds, and/or the other animated actions made by the entities in the input initial compiled animation scene; changes to the attributes of the input initial compiled animation scenes; adjustments to the tuning information; adjustments to the animation setting, and/or other predicted refinement information. In some implementations, the predicted refinement information may reflect the subject input, the additional subject input, the user input, and/or the additional user input.

In some implementations, change indicating component 114 may be configured to indicate, via client computing platforms 104 associated with the one or more subjects, the predicted refinement information and/or other information. The predicted refinement information may be presented via subject interfaces or other interfaces of client computing platforms 104. In some implementations, based on the predicted refinement information, the one or more subjects may input additional subject input and/or one or more of the users may input additional user input that further adjusts the predicted refinement information. The additional subject input and/or the additional user input may be received by input receiving component 116. In some implementations, the additional subject input and/or the additional user input may be stored in electronic storage 120 and utilized for further training of the animation prediction model. In some implementations, the additional subject input and/or the additional user input may be a confirmation or a denial of all or some of the predicted refinement information.

By way of non-limiting illustration, a first motion of the subject (included in the motion capture information for a first entity) may render a first animated motion in a first initial compiled animation scene. First input refinement information may refine the first animated motion to a second animated motion in a corresponding first final compiled animation scene. Thus, based on the first input refinement information, the first initial compiled animation scene, the first final compiled animation scene, and/or other information, the second animated motion may be predicted by the animation prediction model and included in the predicted refinement information.

Server(s) 102a may be configured by machine-readable instructions 106a. Machine-readable instructions 106a may include one or more instruction components. The instruction components may include computer program components. The instruction components may include one or more of model utilization component 118, presentation component 120, and/or other instruction components. Processor(s) 122a, machine readable instructions 106a, and/or other components may be similar to processor(s) 122, machine readable instructions 106, and/or other components of server(s) 102, though included in server(s) 102a. In some implementations, model utilization component 118, presentation component 120, and/or other instruction components may be performed by server(s) 102. In some implementations, record component 110, training component 112, change indicating component 114, input receiving component 116, and/or other instruction components may be performed by server(s) 102a.

Model utilization component 118 may be configured to obtain the entity information for one or more of the entities, the input initial compiled animation scene, and/or other information. In some implementations, model utilization component 118 may be configured to obtain the animation prediction model. In some implementations, the animation prediction model may be obtained from electronic storage 120, external resources 124, other storage, and/or other source. Model utilization component 118 may be configured to facilitate communication with the animation prediction model. The communication may be via wired communication, wireless communication, network(s), and/or other communication routes. Model utilization component 118 may be configured to generate, via the animation prediction model, the predicted refinement information based on the entity information, the input initial compiled animation scene, and/or other information. Thus, the predicted refinement information may include the adjustments to the entity information, the tuning information, and/or other information to compile the output predicted compiled animation scene of the one or more entities integrated with the animation setting. Therefore, model utilization component 118 may be configured to generate, based on the predicted refinement information and/or other information, the output predicted compiled animation scene.

In some implementations, presentation component 120 may be configured to effectuate presentation of the output predicted compiled animation scene via one or more presentation devices associated with the one or more subjects and/or users. In some implementations, the presentation devices may be client computing platforms 104.

In some implementations, model utilization component 118 may be configured to receive secondary subject input and/or secondary user input related to the output predicted compiled animation scene. The secondary subject input and/or the secondary user input may further adjust the attributes of the output predicted compiled animation scene, as described herein, subsequent to the generation the output predicted compiled animation scene as opposed to during the training of the animation prediction model, the recording of the motion capture information, and/or otherwise prior to the output predicted compiled animation scene. The secondary subject input and/or the secondary user input may be stored to electronic storage 120, included in the input refinement information and/or other information, and/or utilized for ongoing training of the animation prediction model.

Referring back to the non-limiting illustration, upon the first motion executed by the subject or other subjects, the second motion may be predicted by the animation prediction model. The second motion may then be utilized to generate a first output predicted compiled animation scene such that the first output predicted compiled animation scene includes the second motion.

Figure 3:
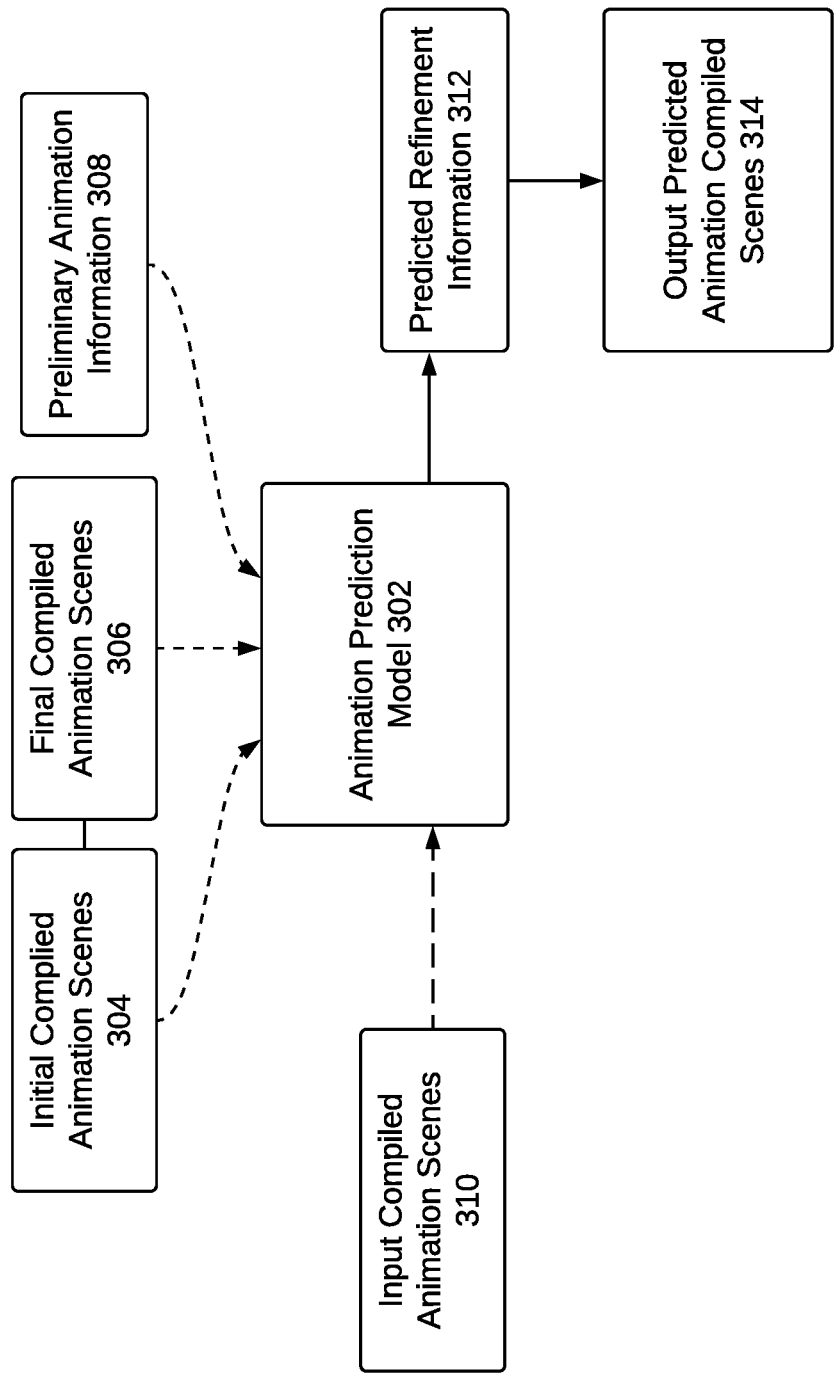
FIG. 3 illustrates an example implementation, in accordance with one or more implementations.

FIG. 3 illustrates an example implementation, in accordance with one or more implementations. FIG. 3 may illustrate an animation prediction model 302. Animation prediction model 302 may receive and utilize initial compiled animation scenes 304, final compiled animation scenes 306 corresponding to final compiled animation scenes 306, and preliminary animation information 308. Based on such, animation prediction model 302 may be trained to predict predicted refinement information 312 upon utilization of animation prediction model 302. Utilization of animation prediction model 302 may include animation prediction model 302 receiving input compiled animation scenes 310 and predicting predicted refinement information 312. Predicted refinement information 312 may then be utilized to generate output predicted compiled animation scenes 314. Output predicted compiled animation scenes 314 may be finalized, or near finalized, animation scenes for viewing by and/or distributing to consumers.

Referring back to FIG. 1, in some implementations, server(s) 102, client computing platform(s) 104, and/or external resources 124 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 124 may be operatively linked via some other communication media.

A given client computing platform 104 may include one or more processors configured to execute computer program components. The computer program components may be configured to enable an expert or subject associated with the given client computing platform 104 to interface with system 100 and/or external resources 124, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 124 may include sources of information outside of system 100, external entities participating with system 100, and/or other resources. In some implementations, some or all of the functionality attributed herein to external resources 124 may be provided by resources included in system 100.

Server(s) 102 may include electronic storage 120, one or more processors 122, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 120 may comprise non-transitory storage media that electronically stores information. The electronic storage media of electronic storage 120 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 120 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 120 may include one or more virtual storage resources (e.g., cloud storage, a virtual private network, and/or other virtual storage resources). Electronic storage 120 may store software algorithms, information determined by processor(s) 122, information received from server(s) 102, information received from client computing platform(s) 104, and/or other information that enables server(s) 102 to function as described herein.

Processor(s) 122 may be configured to provide information processing capabilities in server(s) 102. As such, processor(s) 122 may include one or more of a digital processor, an analog processor, a digital circuit designed to process information, an analog circuit designed to process information, a state machine, and/or other mechanisms for electronically processing information. Although processor(s) 122 is shown in FIG. 1 as a single entity, this is for illustrative purposes only. In some implementations, processor(s) 122 may include a plurality of processing units. These processing units may be physically located within the same device, or processor(s) 122 may represent processing functionality of a plurality of devices operating in coordination. Processor(s) 122 may be configured to execute components 110, 112, 114, 116, 118, and/or 120, and/or other components. Processor(s) 122 may be configured to execute components 110, 112, 114, 116, 118, and/or 120, and/or other components by software; hardware; firmware; some combination of software, hardware, and/or firmware; and/or other mechanisms for configuring processing capabilities on processor(s) 122. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 110, 112, 114, 116, 118, and/or 120 are illustrated in FIG. 1 as being implemented within a single processing unit, in implementations in which processor(s) 122 includes multiple processing units, one or more of components 110, 112, 114, 116, 118, and/or 120 may be implemented remotely from the other components. The description of the functionality provided by the different components 110, 112, 114, 116, 118, and/or 120 described below is for illustrative purposes, and is not intended to be limiting, as any of components 110, 112, 114, 116, 118, and/or 120 may provide more or less functionality than is described. For example, one or more of components 110, 112, 114, 116, 118, and/or 120 may be eliminated, and some or all of its functionality may be provided by other ones of components 110, 112, 114, 116, 118, and/or 120. As another example, processor(s) 122 may be configured to execute one or more additional components that may perform some or all of the functionality attributed below to one of components 110, 112, 114, 116, 118, and/or 120.

Figure 2:
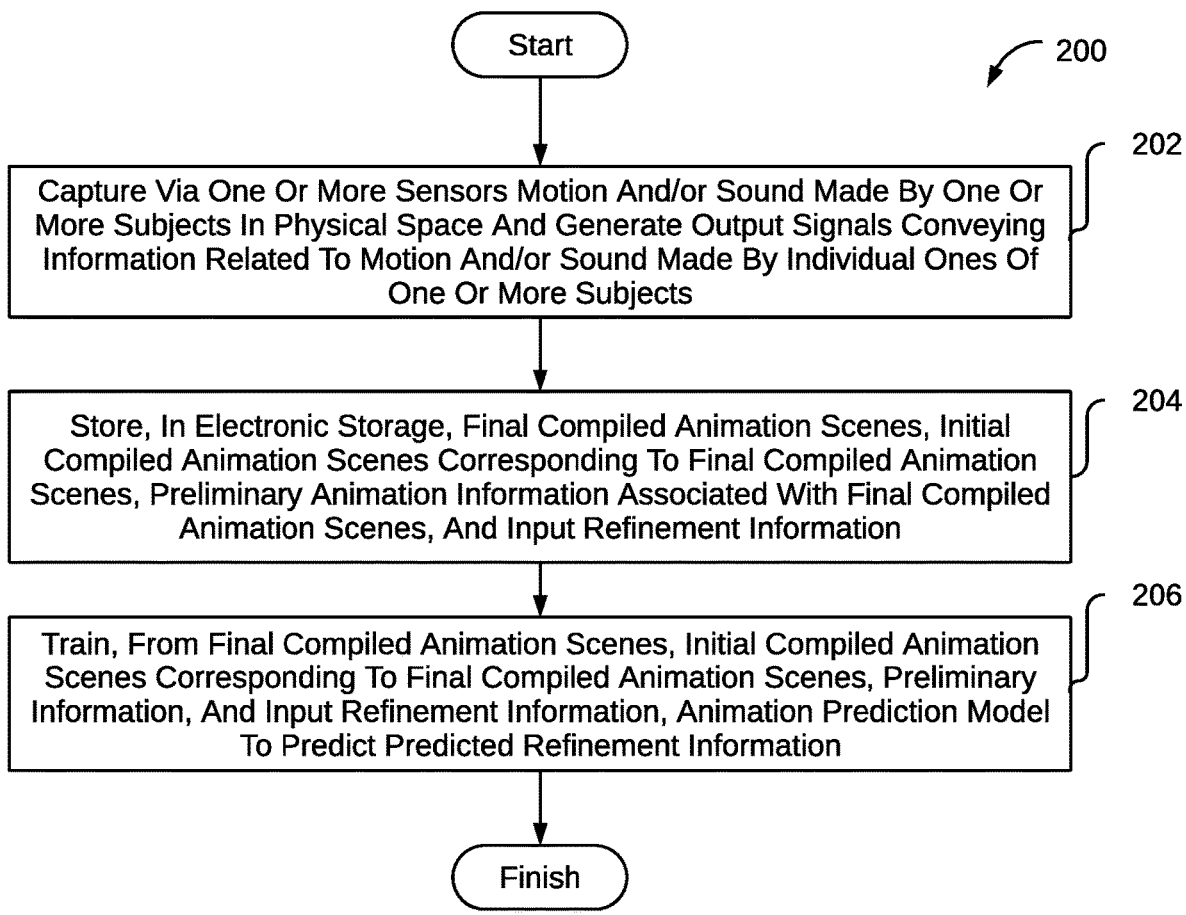
FIG. 2 illustrates a method configured to facilitate animation generation, in accordance with one or more implementations.

FIG. 2 illustrates a method 200 configured to facilitate animation generation, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include capturing, via one or more sensors, motion and/or sound made by one or more subjects in physical space and generate output signals conveying information related to the motion and/or the sound made by individual ones of the one or more subjects. Operation 202 may be performed by one or more hardware processors configured by a component that is the same as or similar to sensor(s) 108, in accordance with one or more implementations.

An operation 204 may include storing, in electronic storage, final compiled animation scenes, initial compiled animation scenes corresponding to the final compiled animation scenes, preliminary animation information associated with the final compiled animation scenes, and input refinement information. Operation 204 may be performed by a component that is the same as or similar to electronic storage 120, in accordance with one or more implementations.

An operation 206 may include training, from the final compiled animation scenes, the initial compiled animation scenes corresponding to the final compiled animation scenes, the preliminary animation information may be associated with the final compiled animation scenes, and the input refinement information an animation prediction model that predicts predicted refinement information. The predicted refinement information may refine an input initial compiled animation scene to an output predicted compiled animation scene based on the input initial compiled animation scene and the preliminary animation information that includes the input initial compiled animation scene. Operation 206 may be performed by one or more hardware processors configured by machine-readable instructions including a component that is the same as or similar to training component 112, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to facilitate animation generation, the system comprising:
   one or more sensors configured to capture motion and/or sound made by one or more subjects in physical space and generate output signals conveying information related to the motion and/or the sound made by individual ones of the one or more subjects;
   electronic storage configured to store final compiled animation scenes, initial compiled animation scenes corresponding to the final compiled animation scenes, preliminary animation information associated with the final compiled animation scenes, and input refinement information, wherein the preliminary animation information includes entity information for entities and tuning information, wherein:
      the entity information includes entity definitions and motion capture information used to generate an associated final compiled animation scene, the individual entity definitions defining the individual entities in the associated final compiled animation scene, and the motion capture information reflecting the motion and/or the sound made by the one or more subjects as the one or more subjects represent the entities in the associated final compiled animation scene,
      the tuning information defines values to animation parameters for the associated final compiled animation scene,
      the initial compiled animation scenes are animation scenes generated initially from the preliminary animation information such that the entity information for the entities are integrated with the tuning information so that the initial compiled animation scenes include the entities manifesting the motion and/or the sound reflected by the motion capture information in an animation setting defined by the tuning information,
      the input refinement information including adjustments to the preliminary animation information and/or the initial compiled animation scenes to refine the initial compiled animation scenes to the final compiled animation scenes; and
   one or more processors configured by machine-readable instructions to:
      train, from the final compiled animation scenes, the initial compiled animation scenes corresponding to the final compiled animation scenes, the preliminary animation information associated with the final compiled animation scenes, and the input refinement information, an animation prediction model that predicts predicted refinement information that refines an input initial compiled animation scene to an output predicted compiled animation scene based on the input initial compiled animation scene and the preliminary animation information that is associated with the input initial compiled animation scene.

2. The system of claim 1, wherein the entities include characters and inanimate objects.

3. The system of claim 1, wherein the predicted refinement information includes adjustments to the entity definitions for the entities included in the input initial compiled animation scene.

4. The system of claim 1, wherein the predicted refinement information includes adjustments to animated motions and/or animated sounds made by the entities in the input initial compiled animation scene, wherein the animated motions and/or the animated sounds are based on the motion capture information of the one or more subjects.

5. The system of claim 1, wherein the predicted refinement information includes changes to attributes of the input initial compiled animation scenes adjusted to create the output predicted compiled animation scene, wherein the one or more processors are further configured by the machine-readable instructions to:
indicate, via a client computing platform associated with a subject, the changes to the attributes.

6. The system of claim 1, wherein the entity definitions include entity values that define entity parameters, the entity parameters including one or more of a visual appearance, an audio, a location, and/or a pose of the individual entities.

7. The system of claim 1, wherein the one or more processors are further configured by the machine-readable instructions to:
receive subject input related to the preliminary animation information and/or the initial compiled animation scenes to refine the initial compiled scenes to the final compiled animation scenes such that the predicted refinement information reflects the subject input.

8. The system of claim 1, wherein predicted refinement information includes adjustments to the tuning information.

9. The system of claim 1, wherein the one or more processors are further configured by the machine-readable instructions to:
effectuate presentation of the final compiled animation scene via one or more presentation devices associated with the one or more subjects.

10. A system configured to utilize an animation prediction model to generate predicted refinement information for input initial compiled animation scenes, the system comprising:
one or more processors configured by machine-readable instructions to:
obtain entity information for one or more entities, the entity information includes entity definitions and motion capture information, the individual entity definitions defining the individual entities, and the motion capture information reflecting motion and/or sound made by one or more subjects as the one or more subjects represent the one or more entities;
obtain an animation prediction model configured to generate predicted refinement information;
facilitate communication with the animation prediction model;
generate, via the animation prediction model, the predicted refinement information based on the entity information, wherein the predicted refinement information includes adjustments to the entity information to compile an output predicted compiled animation scene of the one or more entities integrated with an animation setting; and
generate, based on the predicted refinement information, the output predicted compiled animation scene.

11. A method to facilitate animation generation, the method comprising:
capturing, via one or more sensors, motion and/or sound made by one or more subjects in physical space and generate output signals conveying information related to the motion and/or the sound made by individual ones of the one or more subjects;
storing, via electronic storage, final compiled animation scenes, initial compiled animation scenes corresponding to the final compiled animation scenes, preliminary animation information associated with the final compiled animation scenes, and input refinement information, wherein the preliminary animation information includes entity information for entities and tuning information, wherein:
the entity information includes entity definitions and motion capture information used to generate an associated final compiled animation scene, the individual entity definitions defining the individual entities in the associated final compiled animation scene, and the motion capture information reflecting the motion and/or the sound made by the one or more subjects as the one or more subjects represent the entities in the associated final compiled animation scene,
the tuning information defines values to animation parameters for the associated final compiled animation scene,
the initial compiled animation scenes are animation scenes generated initially from the preliminary animation information such that the entity information for the entities are integrated with the tuning information so that the initial compiled animation scenes include the entities manifesting the motion and/or the sound reflected by the motion capture information in an animation setting defined by the tuning information,
the input refinement information including adjustments to the preliminary animation information and/or the initial compiled animation scenes to refine the initial compiled animation scenes to the final compiled animation scenes; and
training, from the final compiled animation scenes, the initial compiled animation scenes corresponding to the final compiled animation scenes, the preliminary animation information associated with the final compiled animation scenes, and the input refinement information, an animation prediction model that predicts predicted refinement information that refines an input initial compiled animation scene to an output predicted compiled animation scene based on the input initial compiled animation scene and the preliminary animation information that is associated with the input initial compiled animation scene.

12. The method of claim 11, wherein the entities include characters and inanimate objects.

13. The method of claim 11, wherein the predicted refinement information includes adjustments to the entity definitions for the entities included in the input initial compiled animation scene.

14. The method of claim 11, wherein the predicted refinement information includes adjustments to animated motions and/or animated sounds made by the entities in the input initial compiled animation scene, wherein the animated motions and/or the animated sounds are based on the motion capture information of the one or more subjects.

15. The method of claim 11, wherein the predicted refinement information includes changes to attributes of the input initial compiled animation scenes adjusted to create the output predicted compiled animation scene, further comprising:
indicating, via a client computing platform associated with a subject, the changes to the attributes.

16. The method of claim 11, wherein the entity definitions include entity values that define entity parameters, the entity parameters including one or more of a visual appearance, an audio, a location, and/or a pose of the individual entities.

17. The method of claim 11, further comprising:
receiving subject input related to the preliminary animation information and/or the initial compiled animation scenes to refine the initial compiled scenes to the final compiled animation scenes such that the predicted refinement information reflects the subject input.

18. The method of claim 11, wherein predicted refinement information includes adjustments to the tuning information.

19. The method of claim 11, further comprising:
effectuating presentation of the final compiled animation scene via one or more presentation devices associated with the one or more subjects.

20. A method configured to utilize an animation prediction model to generate predicted refinement information for input initial compiled animation scenes, the method comprising:
obtaining entity information for one or more entities, the entity information includes entity definitions and motion capture information, the individual entity definitions defining the individual entities, and the motion capture information reflecting motion and/or sound made by one or more subjects as the one or more subjects represent the one or more entities;
obtaining an animation prediction model configured to generate predicted refinement information;
facilitating communication with the animation prediction model;
generating, via the animation prediction model, the predicted refinement information based on the entity information, wherein the predicted refinement information includes adjustments to the entity information to compile an output predicted compiled animation scene of the one or more entities integrated with an animation setting; and
generating, based on the predicted refinement information, the output predicted compiled animation scene.

* * * * *